United States Patent
Ikenaga et al.

(10) Patent No.: US 6,380,302 B1
(45) Date of Patent: Apr. 30, 2002

(54) SURFACTANT COMPOSITION FOR EMULSION POLYMERIZATION

(75) Inventors: Takayuki Ikenaga; Atsuhito Mori; Hiroyuki Aizawa; Hiroki Sawada; Yasuo Ishii; Yoshinori Mitsuda, all of Wakayama (JP)

(73) Assignee: Kao Corporation, Tokyo (JP)

(*) Notice: Subject to any disclaimer, the term of this patent is extended or adjusted under 35 U.S.C. 154(b) by 0 days.

(21) Appl. No.: 09/517,003

(22) Filed: Feb. 28, 2000

(30) Foreign Application Priority Data

Mar. 4, 1999 (JP) ............................. 11-057128

(51) Int. Cl.$^7$ ............................. C08K 5/41; C08F 2/26; B01F 17/04; B01F 17/42
(52) U.S. Cl. .................... 524/747; 524/801; 524/911; 526/209; 526/225; 516/58; 510/495
(58) Field of Search ................. 516/58, 909; 524/747, 524/801; 526/209, 225, 911; 510/495

(56) References Cited

U.S. PATENT DOCUMENTS

| | | | |
|---|---|---|---|
| 3,006,902 A | * 10/1961 | Trafimow et al. | 526/209 |
| 3,120,505 A | * 2/1964 | McCubbin et al. | 526/209 |
| 3,317,495 A | * 5/1967 | Jones et al. | 526/81 |
| 3,347,805 A | * 10/1967 | Scatena et al. | 524/747 |
| 3,432,455 A | * 3/1969 | Rasicci | 524/745 |
| 3,565,939 A | * 2/1971 | Beiser | 510/495 |
| 3,697,466 A | * 10/1972 | Sullivan et al. | 524/398 |
| 4,218,553 A | * 8/1980 | Winter et al. | 526/209 |
| 4,285,356 A | * 8/1981 | Sifferman | 516/58 |
| 5,539,021 A | * 7/1996 | Pate et al. | 516/58 |

FOREIGN PATENT DOCUMENTS

| | | |
|---|---|---|
| EP | 0 850 907 | 7/1998 |
| EP | 0 882 784 | 12/1998 |
| JP | 57-789310 | 5/1982 |
| WO | WO 97/46311 | 12/1997 |

OTHER PUBLICATIONS

Rosen, Surfactants and Interfacial Phenomena, (John Wiley & Sons, NY, NY, 1983) pp. 94–99, May 1983.*

Database WPI on East, week 198225, London: Derwent Publication, Ltd, AN 1982–51496E, Class A18, JP 57–7936 A (Kao Soap Co Ltd) abstract, 1982.*

Japan Abstract, vol. 006, No. 158 (C–120), Aug. 19, 1982, JP 57–078936, May 17, 1982.

Alexander S. Dunn, et al., Polymer Colloids II, pp. 619–628, "The Effect of the Size of the Initial Micelles on the Nucleation of Latex Particles in the Emulsion Polymerization of Styrene", 1980 Month unknown.

B.B. Kine, et al., Surfactants in Chemical/Process Engineering, pp. 305–310, "Surfactants in Emulsion Polymerization", 1988 Month unknown.

* cited by examiner

*Primary Examiner*—Daniel S. Metzmaier
(74) *Attorney, Agent, or Firm*—Oblon, Spivak, McClelland, Maier & Neustadt, P.C.

(57) ABSTRACT

The present invention provides a surfactant composition for emulsion polymerization. The surfactant composition for emulsion polymerization comprises a compound (a) represented by the formula (I) and having a critical micelle concentration (CMC) in the range of from not less than 0.007 mol L$^{-1}$ to not more than 0.1 mol L$^{-1}$ and a compound (b) represented by the formula (II) and having a CMC in the range of from not less than $1\times10^{-5}$ mol L$^{-1}$ to less than 0.007 mol L$^{-1}$, as essential components, and the molar ratio of the components (a) to (b) in terms of (a)/(b) is from 5/95 to 75/25:

$$R^1O-(A^1O)_m-SO_3M^1 \quad (I)$$

$$R^2O-(A^2O)_n-SO_3M^2 \quad (II)$$

(in the formulae, $R^1$ and $R^2$ are monovalent aliphatic hydrocarbon groups; $A^1$ and $A^2$ are alkylene groups having 2 to 4 carbons; m and n are numbers from 1 to 50; and $M^1$ and $M^2$ are monovalent cations).

7 Claims, No Drawings

SURFACTANT COMPOSITION FOR EMULSION POLYMERIZATION

TECHNICAL FIELD

The present invention relates toga surfactant composition for emulsion polymerization.

PRIOR ART

In an emulsion polymerization of unsaturated monomers, such as vinyl monomers or the like, nonionic surfactants such as polyoxyethylene alkyl ethers, polyoxyethylene alkylphenyl ethers and anionic surfactants such as alkylbenzene sulfonate salts, alkyl sulfate salts, polyoxyethylene alkyl ether sulfate salts, polyoxyethylene alkylphenyl ether sulfate salts, and higher fatty acid salts have been used.

Among them, surfactants having a low critical micelle concentration (hereinafter, called CMC) have been used, because they work effectively even in a small amount. On the other hand, a surfactant having a high CMC is not suitable to use as surfactant for emulsion polymerization. As to the high CMC-having surfactant, its amount being necessary for emulsion polymerization, which exceeds its CMC, is not practical. (A. S. Dunn and W. A. Al-Shahib, Polymer Colloids II, edited by R. M. Fitch, published by Plenum Press, New York, 1980, p619—628).

It is noted that a polyoxyethylene alkyl ether sulfate is used for emulsion polymerization in B. B. Kine & G. H. Ridlick, Surfactants in Chemical/Process Engineering, edited by D. T. Wasan, M. E. Ginn & D. O. Shah, published by Marcel Dekker, New York, 1988, p305–310.

JP-A 57-78936 shows use of a polyoxypropylene alkyl ether sulfate and a polyoxyethylenepolyoxypropylene alkyl ether sulfate for emulsion polymerization.

The properties requested to the surfactants for emulsion polymerization are that stability upon polymerization and mechanical stability of an emulsion are good, that particle size in the emulsion is small showing a low viscosity and that no environmental problem is resulted, and no surfactant which satisfies all of those properties has been available yet.

DISCLOSURE OF THE INVENTION

An object of the present invention is to provide a surfactant composition for emulsion polymerization satisfying all of the above-mentioned properties.

That is, the present invention provides a surfactant composition for emulsion polymerization comprising a compound (a) represented by the formula (I) and having a CMC in the range of from not less than 0.007 mol $L^{-1}$ to not more than 0.1 mol $L^{-1}$ and a compound (b) represented by the formula (II) and having a CMC in the range of from not less than $1\times10^{-5}$ mol $L^{-1}$ to less than 0.007 mol $L^{-1}$, as essential components, at the molar ratio of the components (a) to (b) in terms of (a)/(b) being from 5/95 to 75/25:

$$R^1O-(A^1O)_m-SO_3M^1 \quad (I)$$

$$R^2O-(A^2O)_n-SO_3M^2 \quad (II)$$

(in the formulae, each of $R^1$ and $R^2$ is a monovalent aliphatic hydrocarbon group; each of $A^1$ and $A^2$ is an alkylene group having 2 to 4 carbon atoms; each of m and n shows the average molar number of alkylene oxide added and is a number selected from 1 to 50; each of $M^1$ and $M^2$ is a monovalent cation; and each of plural $A^1$'s and plural $A^2$'s may be same as or different from another of plural $A^1$'s and plural $A^2$'s, given that the number of $A^1$'s is m and the number of $A^2$'s is n.)

It is preferable that the component (a) has a CMC in the range of from not less than 0.01 mol $L^{-1}$ to not more than 0.06 mol $L^{-1}$; $R^1$ has 7 to 11 carbon atoms; m is a number selected from 3 to 30; the component (b) has a CMC in the range of from not less than 0.001 mol $L^{-1}$ to not more than 0.005 mol $L^{-1}$; $R^2$ has 12 to 16 carbon atoms; n is a number selected from 3 to 30; and that (a)/(b) ranges from 10/90 to 50/50.

Further, the present invention provides, also, a process for emulsion polymerization, polymerizing unsaturated monomer(s) in the presence of the above-mentioned composition and use of the above-mentioned composition as an emulsifier for emulsion polymerization of unsaturated monomer(s).

DETAILED DESCRIPTION OF THE INVENTION

The component (a) used in the present invention is a compound which is represented by the formula (I) and which has a CMC of in the range of from not less than 0.007 mol $L^{-1}$ to not more than 0.1 mol $L^{-1}$, preferably 0.01 to 0.06 mol $L^{-1}$ and may be used either solely or jointly by combining two or more. Another component (b) is a compound which is represented by the formula (II) and which has a CMC in the range of from not less than $1\times10^{-5}$ mol $L^{-1}$ to less than 0.007 mol $L^{-1}$, preferably from 0.001 to 0.005 mol $L^{-1}$ and may be used either solely or jointly by combining two or more.

In the present invention, the CMC is a value as measured by means of a conductometric titration.

In the formulae (I) and (II), it is preferable that $R^1$ is a linear or branched alkyl group having 7 to 11 carbon atoms and that $R^2$ is a linear or branched alkyl group having 12 to 24, particularly 12 to 16, carbon atoms. $A^1$ and $A^2$ are preferably ethylene group or propylene group. When two or more kinds of alkylene oxides are added, any of random addition and block addition may be applied. Alternatively, both addition methods may be combined. It is respectively preferable that at least half of $A^1$'s is or are ethylene groups at condition of the half number being m/2 and that at least half of $A^2$'s is or are ethylene groups at condition of the half number being n/2. Then, it is particularly preferable that $A^1$ and $A^2$ are ethylene groups. It is preferable that each of m and n is from 3 to 30. Each of $M^1$ and $M^2$ is preferably an alkaline metal such as sodium and potassium; ammonium; or a protonated amine such as alkanolamine.

The compound represented by the formula (I) or (II) may be manufactured, for example, by adding an alkylene oxide such as ethylene oxide and propylene oxide to an aliphatic monohydric alcohol, then sulfating with a sulfonating agent such as $SO_3$ gas, and neutralizing with NaOH or the like.

The compounding ratio of the components (a) to (b) in the composition of the present invention in terms of a molar ratio of (a)/(b) is from 5/95 to 75/25, preferably from 10/90 to 50/50. When (a)/(b) is less than 5/95, viscosity of the emulsion becomes too high and, in addition, its mechanical stability is not sufficient. On the other hand, when (a)/(b) is more than 75/25, the particle size becomes too big and, in addition, the stability upon polymerization and mechanical stability are not sufficient.

Specific examples of the monomer, which can be subjected to an emulsion polymerization using the surfactant composition of the present invention, include an aromatic vinyl monomer such as styrene, α-methylstyrene and chlorostyrene; an acrylate ester such as methyl acrylate, ethyl acrylate and butyl acrylate; a methacrylate ester such as methyl methacrylate and ethyl methacrylate; a vinyl halide and a vinylidene halide such as vinyl chloride, vinyl bromide and vinylidene chloride; a vinyl ester such as vinyl acetate and vinyl propionate; a nitrile such as acrylonitrile and methacrylonitrile; and a conjugated diene such as butadiene and isoprene. Each of these monomers may be used solely or two or more of them may be used jointly.

It is preferable that the surfactant composition of the present invention is used in the range of 0.1 to 20 parts by weight, particularly 0.5 to 5 parts by weight, per 100 parts by weight of the monomer.

The surfactant composition of the present invention may be used together with a nonionic surfactant such as polyoxyethylene (the molar number of ethylene oxide added being 0 to 100) alkyl or alkenyl (the number of carbon atoms of the alkyl or the alkenyl group being 12 to 24) ether. It is also possible to use a water-soluble protective colloid together.

There is no particular limitation to conditions for the emulsion polymerization using the surfactant composition of the present invention. Preferable amount of the monomer based on the total system is 20 to 70% by weight, particularly 40 to 50% by weight. Incidentally, for the emulsion polymerization of the present invention, may be used any of emulsion polymerization methods such as monomer addition method, batch method and emulsion addition method.

When the surfactant composition of the present invention is used as an emulsifier for an emulsion polymerization, the amount of the coagula generated during the polymerization is small. Namely, the stability upon polymerization is good, the mechanical stability of the obtainable emulsion is also good and the emulsion having the small particle size and the low viscosity is further obtained.

EXAMPLES

Examples 1 to 8 and Comparative examples 1 to 5

The surfactant compositions of the present invention and the surfactant compositions for comparison were prepared using the following (a-1) to (a-3) as the component (a) and the following (b-1) to (b-4) as the component (b) in the compounding ratio as shown in Table 1.

| | | |
|---|---|---|
| (a-1): | $C_8H_{17}O(CH_2CH_2O)_{18}SO_3Na$ | CMC 0.029 mol $L^{-1}$ |
| (a-2): | $i\text{-}C_9H_{19}O(CH_2CH_2O)_{18}SO_3Na$ | CMC 0.021 mol $L^{-1}$ |
| (a-3): | $i\text{-}C_{11}H_{23}O(CH_2CH_2O)_{18}SO_3Na$ | CMC 0.012 mol $L^{-1}$ |
| (b-1): | $C_{12}H_{25}O(CH_2CH_2O)_{18}SO_3Na$ | CMC 0.0046 mol $L^{-1}$ |
| (b-2): | $C_{14}H_{29}O(CH_2CH_2O)_{18}SO_3Na$ | CMC 0.0012 mol $L^{-1}$ |
| (b-3): | $C_{12}H_{25}O(CH_2CH_2O)_{12}SO_3Na$ | CMC 0.004 mol $L^{-1}$ |
| (b-4): | $C_{12}H_{25}O(CH_2CHO)_2(CH_2CH_2O)_{16}SO_3Na$ | |
| | $\quad\quad\quad\quad\quad\;\; |$ | |
| | $\quad\quad\quad\quad\;\; CH_3$ | |
| | CMC 0.0042 mol $L^{-1}$ | |

The CMC mentioned above was measured by the following method.

<Method for measuring the CMC>

100 mL of distilled water was placed in a beaker and its conductivity was measured with stirring (,the conductivity meter used was Model CM-20S manufactured by TOA Electronics Ltd., cell of CG-511B). Each of 0.2 mL of a surfactant solution previously adjusted to a given concentration was dropped into the beaker and the conductivity was read for every dropping. When the concentration of the surfactant in the titration solution is x mol $L^{-1}$ and the volume of the dropped titration solution is y mL, then the surfactant concentration as C of the solution in the beaker is expressed as $C=x\cdot y/(100+y)$. The break (bending point) in the conductance versus concentration curve appears at CMC. The CMC was determined at 25° C.

An emulsion polymerization was carried out by the following monomer addition method using above prepared surfactant composition. The polymer emulsion thus obtained was evaluated according to the following method. The results are shown in Table 1.

(1) Stability upon polymerization (Amount of the coagula)

The polymer emulsion was filtered through a wire gauze having 200 mesh and made of stainless steel. Further, coagula which were adhered on a wall of a reactor and on a stirring blade, etc. after the polymerization were collected as well and filtered in the same manner. After washing with water and drying under 26.6 kPa at 105° C. for 2 hours, the coagula were weighed and the amount thereof was determined. The stability upon polymerization was expressed in terms of % by weight of the coagula based on the total amount of the monomers used.

(2) Mechanical stability 50 g of the polymer emulsion were stirred for 5 minutes using Maron stability tester under the condition of 10 kgf and 1000 r/min, the generated coagula were filtered through a wire gauze having 200 mesh and made of stainless steel, the residue after the filtration was washed with water, dried under 26.6 kPa at 105° C. and weighed. The mechanical stability was expressed in terms of % by weight of the coagula based on the polymer.

(3) Viscosity

The viscosity of the polymer emulsion was measured at 25° C. using Brookfield viscometer at 12 r/min.

(4) Average particle diameter

The average particle diameter of the polymer emulsion was measured by dynamic light scattering method using Model N-4SD manufactured by Coulter Electronics Inc.

<Monomer addition method>

Into a separable flask were charged 316.25 g of deionized water, 8.75 g of the surfactant composition and 0.35 g of potassium persulfate. And then, they were stirred for 30 minutes under nitrogen gas stream.

0.9 g of acrylic acid and 174.1 g of butyl acrylate were mixed, and 8.75 g of this monomer mixture was charged into the above-mentioned flask and heated by placing the flask in a water bath of 60° C. When the temperature reached 58° C., the residual monomer mixture was dropped thereinto over 2 hours. During that period, the temperature in the flask was kept at 60±2° C. After completion of the dropping, the mixture was kept at 60° C. for 3 hours and then cooled down to room temperature to obtain a polymer emulsion.

TABLE 1

| | Surfactant composition | | | | | | |
|---|---|---|---|---|---|---|---|
| | Component (a) | Component (b) | Molar ratio of components (a)/(b) | Stability upon polymerization (%) | Mechanical stability (%) | Viscosity (mPa·s) | Average particle diameter (nm) |
| Examples | | | | | | | |
| 1 | (a-1) | (b-1) | 20/80 | 0.05 | 2.5 | 4000 | 71 |
| 2 | (a-1) | (b-1) | 50/50 | 0.06 | 3.1 | 2000 | 72 |
| 3 | (a-1) | (b-2) | 30/70 | 0.05 | 2.7 | 3700 | 71 |
| 4 | (a-1) | (b-2) | 40/60 | 0.07 | 3.3 | 3300 | 73 |
| 5 | (a-1) | (b-4) | 20/80 | 0.06 | 3.5 | 3800 | 72 |
| 6 | (a-2) | (b-1) | 10/90 | 0.05 | 2.4 | 4200 | 70 |
| 7 | (a-2) | (b-3) | 20/80 | 0.06 | 2.2 | 4300 | 70 |
| 8 | (a-3) | (b-1) | 70/30 | 0.06 | 1.9 | 1500 | 73 |
| Comparative examples | | | | | | | |
| 1 | None | (b-1) | — | 0.15 | 10.5 | 9500 | 70 |
| 2 | None | (b-2) | — | 0.21 | 9.6 | 12000 | 68 |
| 3 | (a-1) | None | — | 0.26 | 15.3 | 600 | 90 |
| 4 | None | (b-1)* | — | 0.68 | 10.2 | 900 | 75 |
| 5 | (a-1) | (b-1) | 80/20 | 0.24 | 12.4 | 1200 | 85 |

*1% of $Na_2SO_4$ being added

Examples 9 to 12 and Comparative examples 6 to 9

The surfactant compositions of the present invention and for comparison were prepared using the above-mentioned (a-1) and (a-2) as the component (a) and the above-mentioned (b-1) and (b-2) as the component (b) in the compounding ratio as shown table 2.

An emulsion polymerization was carried out using the obtained surfactant composition by means of batch method as shown below. The polymer emulsion thus obtained was evaluated by the above-mentioned methods. The results are shown in Table 2.

<Batch method>

Into a separable flask were charged 316.25 g of deionized water, 8.75 g of the surfactant composition and 0.35 g of potassium persulfate. And then, they were stirred for 30 minutes under nitrogen gas stream.

175 g of styrene monomer was charged at once in the above-mentioned flask and heated by placing the flask in a water bath of 65° C. When the temperature in the flask reached about 62° C., the polymerization reaction started. The temperature in the flask was kept at 65±2° C. for 5 hours to complete the polymerization reaction whereupon a polymer emulsion was obtained.

TABLE 2

| | Surfactant composition | | | | | | |
|---|---|---|---|---|---|---|---|
| | Component (a) | Component (b) | Molar ratio of components (a)/(b) | Stability upon polymerization (%) | Mechanical stability (%) | Viscosity (mPa·s) | Average particle diameter (nm) |
| Examples | | | | | | | |
| 9 | (a-1) | (b-1) | 20/80 | 0.15 | 0.24 | 115 | 87 |
| 10 | (a-1) | (b-2) | 50/50 | 0.11 | 0.28 | 80 | 88 |
| 11 | (a-2) | (b-1) | 30/70 | 0.13 | 0.22 | 110 | 87 |
| 12 | (a-2) | (b-2) | 40/60 | 0.14 | 0.23 | 120 | 88 |
| Comparative examples | | | | | | | |
| 6 | None | (b-1) | — | 0.23 | 0.51 | 270 | 88 |
| 7 | None | (b-2) | — | 0.48 | Not determined* | 450 | 84 |
| 8 | (a-1) | None | — | 0.21 | 0.42 | 30 | 92 |
| 9 | (a-1) | (b-1) | 80/20 | 0.22 | 0.48 | 50 | 92 |

*The amount of coagula generated in Maron test, before passing of 5 minutes, was too large to continue stirring.

Examples 13 to 20 and Comparative examples 10 to 13

The surfactant compositions of the present invention and for comparison were prepared using the above-mentioned (a-1) to (a-3) as the component (a) and the above-mentioned (b-1) to (b-4) as the component (b) in the compounding ratio as shown in Table 3.

An emulsion polymerization was carried out using the obtained surfactant composition by means of emulsion addition method as shown below. And then, the polymer emulsion thus obtained was evaluated by the above-mentioned methods. The results are shown in Table 3.

<Emulsion addition method>

2.5 g of acrylic acid, 123.75 g of butyl acrylate and 123.75 g of methyl methacrylate were mixed to prepare a monomer mixture. 5.0 g of the surfactant composition and 0.50 g of potassium persulfate were dissolved into 107.1 g of deionized water, mixed with the above-prepared monomer mixture and emulsified using a homogenizing mixer (T.K. HOMO Mixer, Tokusyu Kika Kogyo Co. Ltd.) at 5000 r/min for 10 minutes to obtain a homogenized monomer emulsion.

137.9 g of deionized water and 36.2 g of the above-mentioned monomer emulsion were charged into a separable flask and stirred for 30 minutes under nitrogen gas stream. Then, the flask was placed in a water bath of 80° C. for heating. An initial polymerization was carried out for 30 minutes and the residual monomer emulsion was dropped thereinto over 2 hours. During that period, the temperature in the flask was kept at 80±2° C. After completion of the dropping, the mixture was kept at 80° C. for 3 hours and cooled down to room temperature to obtain a polymer emulsion.

in which each of $R^1$ and $R^2$ is a monovalent aliphatic hydrocarbon group; each of $A^1$ and $A^2$ is an ethylene group; each of m and n shows the average molar number of ethylene oxide added and is a number selected from 1 to 50; each of $M^1$ and $M^2$ is a monovalent cation.

2. The composition as claimed in claim 1, in which the compound (a) has a critical micelle concentration (CMC) in the range of from not less than 0.01 mol $L^{-1}$ to not more than 0.06 mol $L^{-1}$; the compound (b) has a CMC in the range of from not less than 0.001 mol $L^{-1}$ to not more than 0.005 mol $L^{-1}$.

3. The composition as claimed in claim 1, in which each of m and n is a number selected from 3 to 30.

4. The composition as claimed in claim 1, in which the ratio of (a)/(b) ranges from 10/90 to 50/50.

5. The composition of claim 1, wherein $R^1$ is a $C_{7-11}$ alkyl and $R^2$ is a $C_{12-24}$ alkyl.

6. A process for emulsion polymerization, polymerizing unsaturated monomer(s) in the presence of a surfactant composition comprising:

a compound (a)
  represented by a formula (I) and
  having a critical micelle concentration (CMC) in the range of from not less than 0.007 mol $L^{-1}$ to not more than 0.1 mol $L^{-1}$ and

TABLE 3

| | Surfactant composition | | | | | | |
|---|---|---|---|---|---|---|---|
| | Component (a) | Component (b) | Molar ratio of components (a)/(b) | Stability upon polymerization (%) | Mechanical stability (%) | Viscosity (mPa · s) | Average particle diameter (nm) |
| Examples | | | | | | | |
| 13 | (a-1) | (b-1) | 20/80 | 0.08 | 0.12 | 650 | 177 |
| 14 | (a-1) | (b-1) | 50/50 | 0.06 | 0.25 | 410 | 185 |
| 15 | (a-1) | (b-2) | 30/70 | 0.05 | 0.31 | 750 | 175 |
| 16 | (a-1) | (b-2) | 40/60 | 0.06 | 0.27 | 530 | 182 |
| 17 | (a-1) | (b-4) | 20/80 | 0.08 | 0.22 | 570 | 178 |
| 18 | (a-2) | (b-1) | 10/90 | 0.07 | 0.13 | 870 | 174 |
| 19 | (a-2) | (b-3) | 20/80 | 0.06 | 0.18 | 680 | 177 |
| 20 | (a-3) | (b-1) | 70/30 | 0.06 | 0.34 | 330 | 185 |
| Compartive examples | | | | | | | |
| 10 | None | (b-1) | — | 0.32 | 1.2 | 1200 | 163 |
| 11 | None | (b-2) | — | 0.35 | 2.5 | 1400 | 160 |
| 12 | (a-1) | None | — | 0.28 | 15.3 | 220 | 205 |
| 13 | (a-1) | (b-1) | 80/20 | 0.31 | 13.8 | 250 | 205 |

What is claimed is:

1. A surfactant composition for emulsion polymerization, comprising a compound (a)
  represented by a formula (I) and
  having a critical micelle concentration (CMC) in the range of from not less than 0.007 mol $L^{-1}$ to not more than 0.1 mol $L^{-1}$ and a compound (b)
  represented by a formula (II) and
  having a CMC in the range of from not less than $1\times10^{-5}$ mol $L^{-1}$ to less than 0.007 mol $L^{-1}$, as essential components, at the molar ratio of the components (a) to (b) in terms of (a)/(b) being from 5/95 to 75/25:

$$R^1O\text{—}(A^1O)_m\text{—}SO_3M^1 \quad (I)$$

$$R^2O\text{—}(A^2O)_n\text{—}SO_3M^2 \quad (II)$$

a compound (b)
  represented by a formula (II) and
  having a CMC in the range of from not less than $1\times10^{-5}$ mol $L^{-1}$ to less than 0.007 mol $L^{-1}$, as essential components, at the molar ratio of the components (a) to (b) in terms of (a)/(b) being from 5/95 to 75/25:

$$R^1O\text{—}(A^1O)_m\text{—}SO_3M^1 \quad (I)$$

$$R^2O\text{—}(A^2O)_n\text{—}SO_3M^2 \quad (II)$$

in which each of $R^1$ and $R^2$ is a monovalent aliphatic hydrocarbon group; each of $A^1$ and $A^2$ is an ethylene group; each of m and n shows the average molar number of ethylene oxide added and is a number selected from 1 to 50; each of $M^1$ and $M^2$ is a monovalent cation.

7. The method of claim 6, wherein $R^1$ is a $C_{7-11}$ alkyl and $R^2$ is a $C_{12-24}$ alkyl.

* * * * *